2,590,244

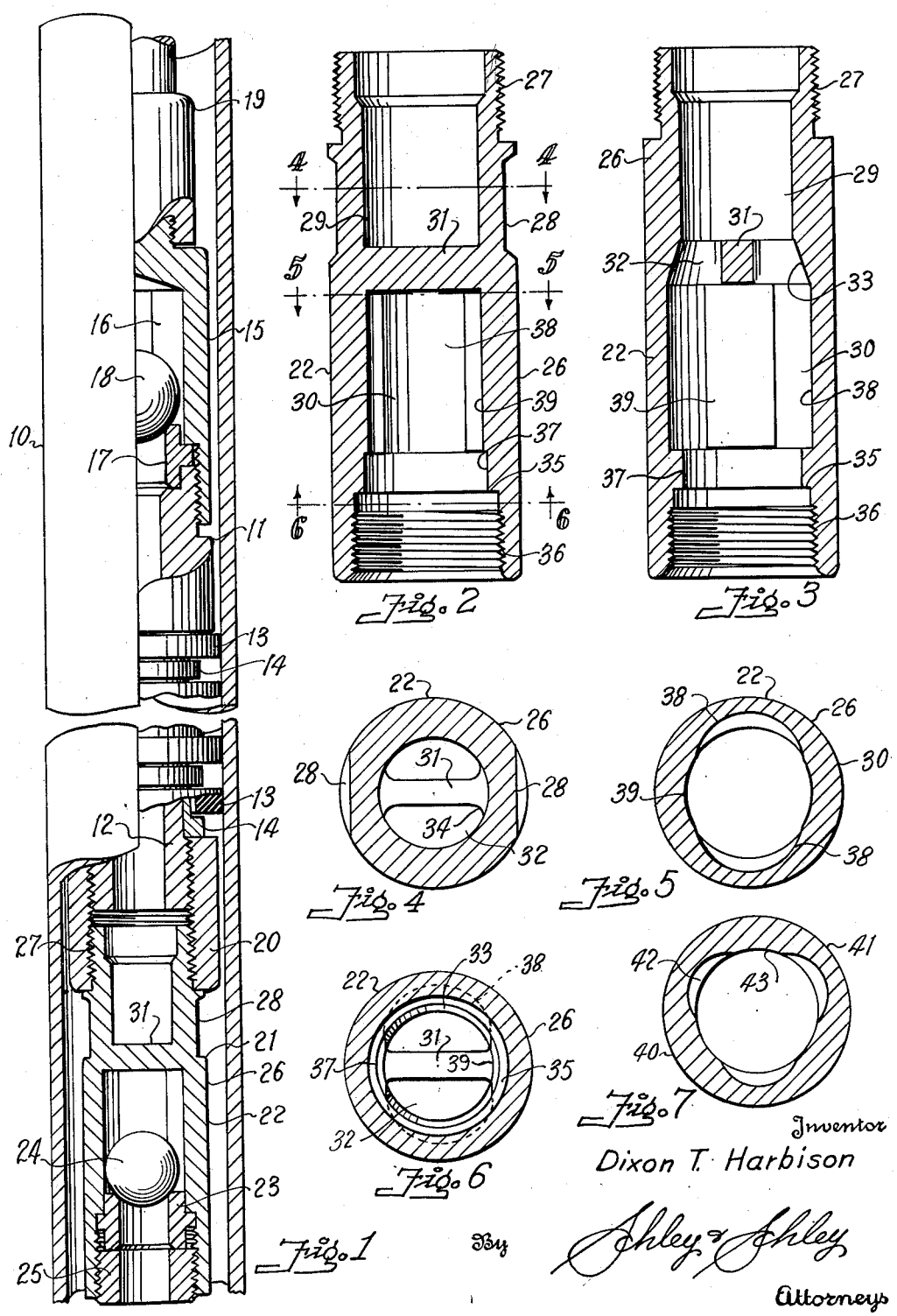
March 25, 1952 — D. T. HARBISON — 2,590,244
VALVE CAGE
Filed Feb. 21, 1948
Inventor
Dixon T. Harbison
By Ashley & Ashley
Attorneys Patented Mar. 25, 1952

UNITED STATES PATENT OFFICE 2,590,244

VALVE CAGE

Dixon T. Harbison, Fort Worth, Tex.

Application February 21, 1948, Serial No. 10,061

2 Claims. (Cl. 251—121)

This invention relates to new and useful improvements in valve cages and more particularly to blind valve cages.

A conventional oil well pump includes a tubular plunger reciprocable within a close fitting cylinder or working barrel and having a ball valve at its lower end mounted within a blind cage for controlling the passage of fluid therethrough. Ordinarily, a blind cage consists of a cylindrical sleeve screw-threaded at each end for connection with the plunger and a collar which supports a removable valve seat therein. Longitudinal ribs are formed in the bore of the sleeve above the seat so as to guide the ball into engagement with said seat and provide flow passages around said ball when the latter is spaced from its seat. Heretofore, blind cages were made largely from castings and were designed to function mechanically without regard to pressures, stresses or strains. In relatively shallow wells, it was unnecessary to consider these factors; however, as wells became deeper and the pressures encountered greater, blind cages have been made from the strongest steel bars and forgings obtainable and have been designed to provide maximum safety. The guide ribs have always been subject to wear and, when said ribs become worn, the ball fails to seat properly so as to require replacement of the cage. In deep wells, six thousand feet or greater, extremely high pressures are encountered and the blind cages frequently split due to lack of strength or proper design. One point of weakness has been at the sharp corners or lines of demarcation formed by the usual angular guide ribs. Since the internal diameter of the working barrel limits the amount of metal that can be used, it is very difficult to provide a construction having the requisite strength.

Therefore, one object of the invention is to provide an improved blind valve cage of such construction that it will withstand the pressures encountered in deep wells and the stresses and strains imposed thereupon.

A particular object of the invention is to provide an improved blind valve cage having relatively thick walls and cross-sections whereby maximum strength is had.

An important object of the invention is to provide an improved blind valve cage having its flow passages formed in such manner as to provide guide surfaces of amplified width and without sharp edges or lines of demarcation therebetween whereby the wall thickness of the cage is substantially maintained and its strength materially unimpaired.

Another object of the invention is to provide an improved blind valve cage, of the character described, wherein the flow passages are formed by milling arcuate grooves in the bore of the cage, the grooves being shallow and wide and merging into the guide surfaces so as to eliminate the usual sharp lines of demarcation therebetween and to obtain the greatest possible wall thickness.

A construction designed to carry out the invention will be hereinafter described together with other features of the invention.

The invention will be more readily understood from a reading of the following specification and by reference to the accompanying drawing, wherein examples of the invention are shown, and wherein:

Fig. 1 is a view, partly in elevation and partly in section, of a pump plunger having a blind valve cage, constructed in accordance with the invention, at its lower end, Fig. 2 is a transverse, vertical, sectional of the blind cage, Fig. 3 is a view, similar to Fig. 2, taken at a right angle thereto, Fig. 4 is a horizontal, cross-sectional view, taken on the line 4—4 of Fig. 2, Fig. 5 is a horizontal, cross-sectional view, taken on the line 5—5 of Fig. 2, Fig. 6 is a horizontal, cross-sectional view, taken on the line 6—6 of Fig. 2, and Fig. 7 is a horizontal, cross-sectional view of a modified form of a modified blind valve cage.

In the drawing, the numeral 10 designates the working barrel of a conventional oil well pump which is connected in a tubing string (not shown) in the usual manner. The pump includes a plunger 11 adapted to reciprocate within the bore of the working barrel 10 and having a tubular body or mandrel 12 upon which a plurality of packing rings 13 are mounted by means of suitable spacers 14. A travelling valve 15, including a cage 16, seat 17 and ball 18, is connected to the upper end of the mandrel 12 and serves to connect said mandrel to the usual pump rods 19. Although the construction of the mandrel is subject to variation, a collar 20 is shown screw-threaded upon the lower end of said collar for retaining the packing rings 13 and spacers 14 thereon.

In deep well pumps, it is customary to provide a second valve 21 which consists of a blind cage or housing 22, a seat 23 and a ball 24. It is preferable to mount this valve at the bottom of the plunger with the cage 22 being screw-threaded in the lower end of the collar 20 so as to depend from the mandrel 12. A collar or seat support 25 is screw-threaded into the lower end of the cage 22 for removably retaining the seat 23 therein. The cage may be formed in any desired manner, but in order to obtain the necessary strength it is preferred to machine the same from a cylindrical steel bar of the proper length. It is noted that the blind valve cage may be frequently used without the upper valve.

As it is most clearly shown in Figs. 2 and 3, the blind valve cage 22 includes a cylindrical sleeve or body 26 having external screw-threads 27 at its upper end for connecting said cage to the collar 20. Wrench faces 28 are formed on the body below the threads 27 to facilitate such connection. Axial bores 29 and 30, of equal diameter, are formed in the upper and lower ends of the body by drilling or other suitable means. The lower bore 30 is of greater length than the upper bore 29 and said bores are spaced from each other by an intermediate bridge or partition 31. A pair of semi-circular ports 32 are formed in the bridge to establish communication between the bores (Fig. 4) and have their vertical straight walls disposed in adjacent parallel relation. The outer curved walls of the ports 32 diverge outwardly and downwardly as shown by the numeral 33 (Figs. 3 and 6) whereby the lower ends of said ports are of greater area than the upper ends thereof. Thus, the bridge 31 functions as a spider. As shown by the numeral 34, the end portions of the curved walls 33 are preferably arced or curved so as to merge into the straight walls of the ports and eliminate sharp corners (Fig. 4).

For receiving the valve seat 23, the lower portion of the bore 30 is enlarged to provide an annular shoulder 35 and screw-threads 36 are formed therebelow for engagement by the retaining collar 25. Immediately above the shoulder 35, the bore is enlarged slightly as shown by the numeral 37 (Figs. 2 and 6) to accommodate the upper portion of the seat. It is pointed out that the bore is of slightly greater diameter than the valve ball 24 so as to permit movement of said ball in accordance with the flow of fluid through said bore. In order to permit flow around the ball when the same is unseated, a pair of elliptical arcuate passageways or grooves 38 are milled or otherwise formed in the bore 30 preferably diametrically of each other and in vertical alinement with the ports 32. The grooves 38 function as flow channels and are relatively wide and shallow, being swung on arcs slightly less than the arc upon which the bore is swung and providing guide surfaces or ribs 39 of amplified width therebetween. Although not necessary, it is desirable for the guide surfaces 39 to be of substantially the same width as the grooves. It is noted that the depth and curvatures of the grooves is such that there are no sharp lines of demarcation between the adjacent portions of the ports and grooves nor between said grooves and guide surfaces. In addition, the amplified width of the guide surfaces results in less overall wear of said surfaces and prolonged life of the blind cage.

Since the function of the cage is conventional, it is believed unnecessary to describe the operation of the same. The invention described herein resides primarily in the provision of a blind cage of sufficient strength to withstand the high pressures encountered in deep wells as well as the strains and stresses imposed thereupon in the operation and assembling of the pump plunger. Due to the particular formation of the passageways or grooves 38, an increased amount of metal is retained and the greatest possible wall thickness maintained without reducing the area of said passageways. Weak points have been eliminated by omitting sharp corners or lines of demarcation. The construction also provides wide guide ribs or surfaces which give increased wear so as to prolong the usefulness of the blind cage.

Although it is desirable to employ pairs of ports and passageways, it is pointed out that substantially the same strength and results may be obtained by the use of three ports and passageways. In Fig. 7, a blind valve cage 40 is shown and includes a cylindrical sleeve or body 41 having axial bores in its ends substantially identical to the body 26 of the cage 22. A trio of passageways or grooves 42 are formed in the wall of the lower bore so as to provide a trio of guide ribs or surfaces 43. Since the grooves and guide surfaces are substantially identical to the grooves 38 and guide surfaces 39, a detailed description of the same is believed to be superfluous; however, the former are necessarily of less width than the latter.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A blind valve cage including, a one-piece body having an axial bore therein, an annular shoulder in the bore constructed to receive a valve seat thereagainst, the body having a valve-ball-receiving chamber in the bore above the annular shoulder, an integral bridge extending transversely and substantially diametrically of the bore immediately above the valve-ball-receiving chamber, the bore having equally spaced longitudinal grooves in its wall in the chamber and valve-ball-guide surfaces formed intermediate the grooves, said grooves being arcuate and relatively shallow in cross-section and being of substantially the same transverse width as the guide surfaces and merging smoothly thereinto so as to eliminate sharp corners and areas of small radii of curvature within the bore of the body and to retain the optimum tensile and bursting strength therefor.

2. A blind valve cage including, a one-piece body having an axial bore therein, an annular shoulder in the bore constructed to receive a valve seat thereagainst, the body having a valve-ball-receiving chamber in the bore above the annular shoulder, an integral bridge extending transversely of the bore above the valve-ball-receiving chamber, the bore having spaced longitudinal grooves in its wall in the chamber and valve-ball-guide surfaces formed intermediate the grooves, said grooves being wide and shallow and having cylindrical walls struck on a radius only slightly less than the radius of said bore whereby the walls of said grooves merge smoothly into the wall of the bore and sharp wall intersections and areas of small radii of curvature within the bore of the body are eliminated and the optimum tensile and bursting strength of the body are retained, the valve-wall-receiving chamber and the grooves having walls extending parallel to the longitudinal axis of the bore and terminating at the bridge whereby a valve ball may undergo longitudinal movement in the chamber freely and the grooves form clear flow passages.

DIXON T. HARBISON.

REFERENCES CITED

The following references are of record in the file of this patent:

UNITED STATES PATENTS

| Number | Name | Date |
|---|---|---|
| 2,071,036 | Johnston | Feb. 16, 1937 |
| 2,294,568 | Nielsen | Sept. 1, 1942 |
| 2,296,135 | Batson | Sept. 15, 1942 |
| 2,409,220 | Melichar | Oct. 15, 1946 |

FOREIGN PATENTS

| Number | Country | Date |
|---|---|---|
| 90,523 | Sweden | of 1937 |
| 453,489 | Great Britain | of 1936 |